2,962,330
Patented Nov. 29, 1960

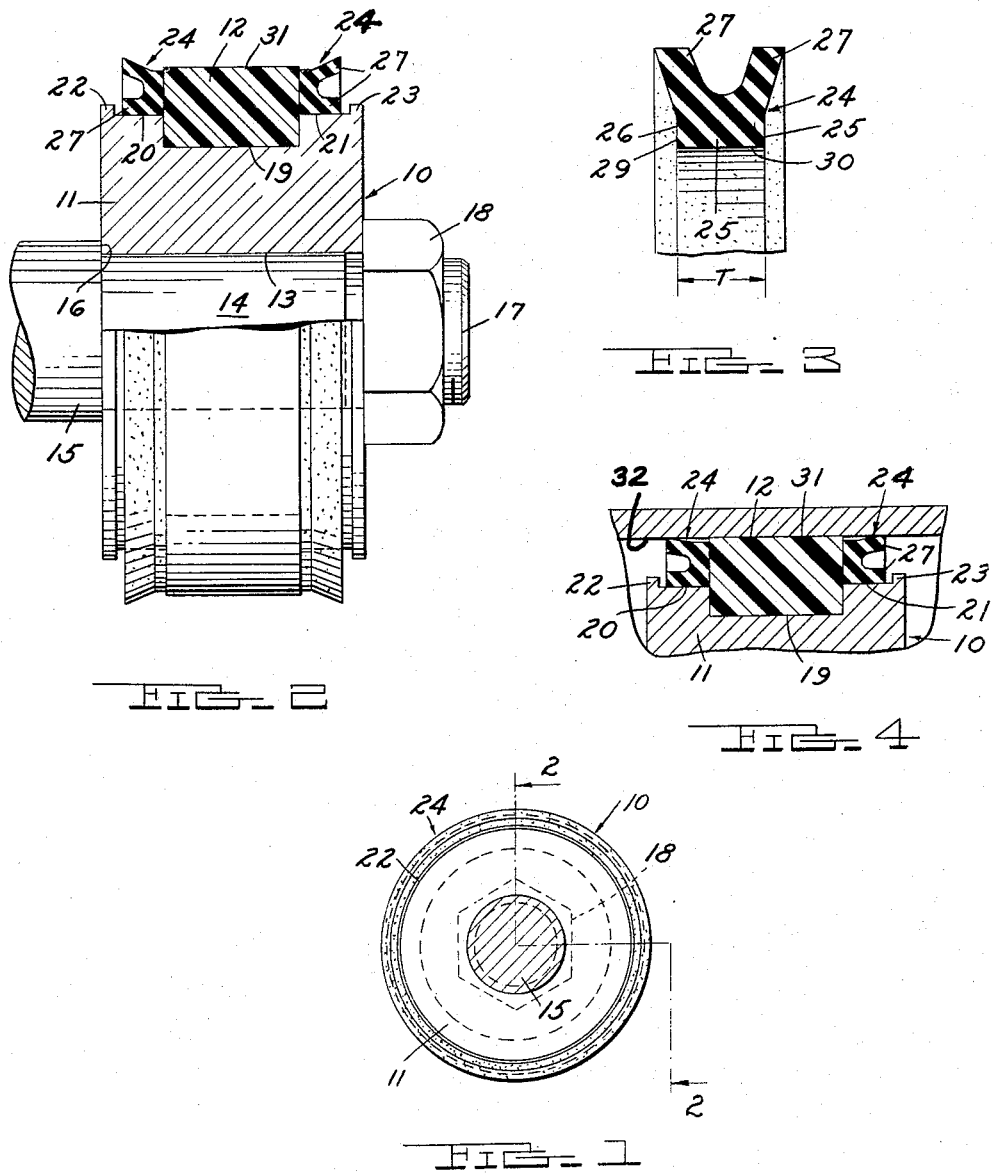

2,962,330
PISTON ASSEMBLY
John Kohl, 111 E. Ten Mile Road, Hazel Park, Mich.

Filed May 9, 1957, Ser. No. 658,064

7 Claims. (Cl. 309—23)

This invention relates to pistons and particularly to a piston assembly which is used in pneumatic or hydraulic cylinders.

It has long been known that a piston made of metal has definite advantages from the standpoint of strength when used in pneumatic or hydraulic cylinders. However, such metal cylinders have the particular disadvantage that they tend to score the walls of the cylinder. It has therefore been proposed to make the piston of plastic. Such plastic pistons lessen the tendency to score the cylinder walls but have disadvantages in that they are low in strength and are adversely affected by the pressure force of the pressure medium on the plastic piston.

In addition, in prior piston arrangements it has been necessary to add a packing prior to inserting the piston in the cylinder in order to provide a suitable seal. This has necessitated that the user maintain an inventory of the various components of the piston assembly. In addition, when inexperienced personnel attempt to insert the packing there is a great tendency for the packing to be improperly applied, resulting in leakage and failures.

It is therefore an object of this invention to provide a piston which has the strength of metal and the desirable non-scoring properties of plastic.

It is a further object of this invention to provide such a piston which is made of metal and plastic wherein the pressure forces of the pressure medium are primarily applied to the metal and a minimum pressure force of the pressure medium is applied to the plastic.

It is a further object of this invention to provide such a piston assembly which may be assembled at the factory and needs no additional packing prior to insertion in the cylinder.

It is a further object of this invention to provide such a piston which has an improved contact surface for contact with the cylinder wall.

In the drawings:

Fig. 1 is an end elevational view of the piston assembly embodying the invention as applied to a piston rod.

Fig. 2 is a sectional view, on an enlarged scale, taken along the line 2—2 in Fig. 1.

Fig. 3 is a fragmentary sectional view of a portion of the packing material used in the piston assembly.

Fig. 4 is a fragmentary sectional view showing the piston in bearing contact with the cylinder wall.

Referring to Figs. 1 and 2, piston assembly 10 comprises a cylindrical metal portion 11 and an annular plastic portion 12. Cylindrical metal portion 11 includes an opening 13 extending axially therethrough which permits the piston assembly 10 to be mounted on the end 14 of a piston rod 15. The end 14 of piston rod 15 is of reduced diameter providing a shoulder 16 against which the piston 10 abuts. The extreme end of the rod is threaded as at 17 to receive a nut 18 for locking the piston 10 on the piston rod.

Annular plastic portion 12 is supported in annular groove 19. Peripheral surfaces 20, 21 of metal portion 11 adjacent groove 19 are highly polished. Metal portion 11 includes radially extending flange portions 22, 23 at the axial extremities thereof. Packing rings 24 are provided on each side of annular plastic portion 12 in contact with polished surfaces 20, 21.

Piston 10 is made by wrapping a strip of fabric impregnated with a resin around the metal portion 11. The width of the strip of impregnated fabric is equal to the width of annular groove 19 and is wrapped around the metal portion in continuous laminations until the outer diameter of the wrapped fabric exceeds the desired finished dimension of plastic portion 12. A mold is then enclosed about the piston and the wrapped fabric is compressed and cured at elevated temperatures to form the plastic portion 12. The control of the diameter, degree of roundness and concentricity is obtained by properly forming and controlling the design of the mold.

The resultant piston 10 has the plastic portion 12 securely locked in the metal portion 11. The width of annular groove 19 is preferably several times the depth of annular groove 19. The thickness of annular plastic portion 12 is preferably about twice the depth of annular groove 19.

As shown in Fig. 3, each packing ring 24 is of generally U-shaped cross section and comprises a base portion 25, the sides 26 of which are at right angles to the base surface 30, and diverging legs 27. As shown in Fig. 4, the thickness T of each packing ring is slightly less than the dimension of the portion of the plastic portion 12 which projects radially beyond the surfaces 20, 21 so that the side 26 of base portion 25 of each ring does not contact the cylinder walls. As shown in Figs. 2 and 4, when the packing rings 24 are in position, one leg 27 of one ring 24 is flexed against polished surface 21 and one leg 27 of the other ring 24 is flexed against polished surface 20 to provide a seal between the packing ring and metal portion 11. Base surface 30 of each packing ring abuts against the plastic portion 12. When the piston assembly is in the cylinder, a seal is obtained between the cylinder wall 32 and the piston assembly by flexing of the other leg of each packing ring, as shown in Fig. 4.

The fabric which is used in making the plastic portion 12 is preferably cotton sheeting but may be cotton duck.

The resin which is used to impregnate the fabric is preferably of the phenol-formaldehyde thermosetting type.

Packing rings 24 are preferably made of synthetic rubber but may be also made of natural rubber.

When a piston assembly as shown in Fig. 2 is used in a cylinder, plastic portion 12 provides a cylindrical bearing surface 31 in contact with the cylinder wall 32. The bearing surface 31 substantially reduces the scoring which might occur if the surface were made of metal. Packing rings 24, being disposed between plastic portion 12 and the pressure medium, prevent contact between the pressure medium and plastic portion 12. As a result, plastic portion 12 is not adversely affected by contact with the pressure medium which may comprise air, oil, water and the like. The seal is obtained between polished surfaces 20, 21 and the packing rings. It is only necessary that plastic portion 12 withstand the force on the packing. In the above arrangement, no back-up washer is required for the packing rings.

The piston assembly which has been described has the further advantage in that a metal-to-metal contact is provided between the metal portion 11 and the piston rod 15 in order to provide strength in the connection between the piston 10 and the piston rod 15. The portion of plastic portion 12 which is subjected to the force of the pressure medium is small in area compared with the area of metal portion 11 so that any inequalities in pressure are applied in the main to the metal portion.

A further advantage of the piston assembly which has been described is that the assembly may be easily assembled at the factory without any danger of error in assembly. The assembled piston assembly provides a single unit which a user may keep in inventory rather than a multiplicity of parts. In addition, errors which might occur by inexperienced personnel attempting to insert packing are entirely eliminated, since the piston assembly as supplied from the factory may be inserted directly in the cylinder without the need for additional packing.

Although I do not wish to be bound by the theory involved, in my opinion, improved results are obtained by the bearing surface being made of fabric and resin because of a lapping action of such plastic portion on the cylinder wall.

It can thus be seen that I have provided a piston which has the strength of metal and the desirable non-scoring properties of plastic. According to my construction, the pressure forces of the pressure medium are primarily applied to the metal and a minimum pressure force of the pressure medium is applied to the plastic. This permits the piston to be utilized at high operating pressures of the pressure medium. The piston, according to my invention, is in the form of a piston assembly which is assembled at the factory. The consumer need only maintain an inventory of a single assembly. When it is desired to replace a piston, the entire assembly is replaced. Such an arrangement not only reduces the inventory which must be maintained but, in addition, avoids any errors which might occur when inexperienced personnel attempt to insert the packing or other elements in the piston assembly. In addition, the piston embodying my invention provides an efficient and effective seal between the packing ring and the metal without relying on the plastic for the purpose of maintaining the seal.

I claim:

1. A piston assembly comprising a piston having a cylindrical metal portion, said metal portion having an annular U-shaped groove in the periphery thereof generally centrally along the axis thereof, an annular portion of rigid plastic material mounted in said groove, said annular portion extending radially beyond the confines of said groove and having the periphery thereof forming a cylindrical bearing surface, and an annular packing member of elastic material mounted on said metal portion adjacent each side of said plastic portion, each said packing member having a first portion of the periphery thereof projecting radially beyond said cylindrical bearing surface of said plastic portion and a second portion of the periphery thereof adjacent said plastic portion having a lesser diameter than the cylindrical bearing surface of said plastic portion.

2. The combination set forth in claim 1 wherein said plastic portion is molded in situ in the metal portion.

3. The combination set forth in claim 2 wherein said plastic portion comprises fabric impregnated with cured thermosetting resin.

4. The combination set forth in claim 3 wherein said fabric comprises cotton sheeting and said resin is of the phenol-formaldehyde type.

5. A piston assembly comprising a piston having a generally cylindrical metal portion and an annular rigid plastic portion formed in situ in the periphery of said metal portion, said plastic portion projecting radially beyond the outer periphery of said metal portion and having its outer periphery providing a cylindrical bearing surface, said plastic portion comprising fabric and a cured thermosetting material.

6. A piston assembly comprising a piston having a cylindrical metal portion, said metal portion having an annular U-shaped groove in the periphery thereof generally centrally along the axis thereof, an annular portion of rigid plastic material permanently molded in place in said groove, said annular portion extending radially beyond the confines of said groove and having the periphery thereof forming a cylindrical bearing surface, the peripheral surfaces of said metal portion adjacent said groove being highly polished, and an annular packing member of elastic material mounted on each said surface adjacent each side of said plastic portion and in contact therewith.

7. A piston assembly comprising a piston having a generally cylindrical metal portion and an annular rigid plastic portion formed in situ in the periphery of said metal portion, said plastic portion projecting radially beyond the outer periphery of said metal portion and having its outer periphery providing a cylindrical bearing surface, including an annular packing member of resilient material mounted on each end of said metal portion adjacent each side of said plastic portion, each said packing member having a portion of the periphery thereof projecting radially beyond said cylindrical bearing surface of said plastic portion, said metal portion including an integral flange at each end thereof extending radially, each said packing member being positioned between a flange and said plastic portion, each said packing member being generally U-shaped in cross section and comprising a base and legs diverging away from said base, said packing member being mounted on said metal portion with the legs extending away from said plastic portion and said base in contact with said plastic portion, the width of said base being less than the thickness of the portion of said plastic portion which projects radially beyond said metal portion.

References Cited in the file of this patent

UNITED STATES PATENTS

| | | |
|---|---|---|
| 1,892,022 | Tyler | Dec. 27, 1932 |
| 2,081,040 | King | May 18, 1937 |
| 2,199,950 | Flinchum | May 7, 1940 |
| 2,402,268 | Young | June 18, 1946 |
| 2,597,829 | Stillwagon | May 20, 1952 |
| 2,615,769 | Barnes et al. | Oct. 28, 1952 |
| 2,687,335 | Bowerman | Aug. 24, 1954 |